United States Patent [19]

Anderson

[11] 4,326,662
[45] Apr. 27, 1982

[54] PROCESS OF ULTRASONICALLY SOLDERING DRAWN ALUMINUM TUBING PRODUCTS

[75] Inventor: Bruce E. Anderson, Massena, N.Y.

[73] Assignee: Aluminum Company of America, Pittsburgh, Pa.

[21] Appl. No.: 183,355

[22] Filed: Sep. 2, 1980

[51] Int. Cl.$^3$ .......................... B23K 1/06; B23K 31/06
[52] U.S. Cl. .................................... 228/111; 228/183; 228/262
[58] Field of Search ...................... 72/41, 42, 282, 283; 228/110, 111, 173 A, 173 B, 183, 203, 262

[56] References Cited

U.S. PATENT DOCUMENTS

| | | | |
|---|---|---|---|
| 2,254,853 | 9/1941 | Mouromtseff et al. | 228/203 X |
| 2,824,818 | 2/1958 | Swenson | 228/203 X |
| 3,218,693 | 11/1965 | Allen et al. | 228/173 A |
| 3,633,266 | 1/1972 | Taylor | 228/183 X |
| 3,680,200 | 8/1972 | Terrill et al. | 228/262 X |
| 4,172,548 | 10/1979 | Nakamura | 228/183 |

FOREIGN PATENT DOCUMENTS

| | | | |
|---|---|---|---|
| 50-45512 | 3/1980 | Japan | 228/203 |
| 1434534 | 5/1976 | United Kingdom | 228/173 B |

OTHER PUBLICATIONS

Fluxless Soldering of Aluminum Heat Exchangers, W. B. Jenkins, Welding Journal, Jan. 1976, pp. 28–35.

Primary Examiner—Ervin M. Combs
Attorney, Agent, or Firm—Carl R. Lippert

[57] ABSTRACT

The ultrasonic soldering of continuously drawn coilable aluminum tube to provide soldered socket joints is improved where the tube, after continuous and sequential drawing to produce a work hardened tube, is subjected to a burnishing operation by being drawn through a burnishing die. The burnishing operation differs from the drawing operation used to produce the continuously drawn tube in that the burnishing does not substantially alter the wall thickness of the tube. The burnishing dies condition the outer tube surface to be more wettable by molten solder metal in fluxless ultrasonic soldering processes.

17 Claims, 3 Drawing Figures

PROCESS OF ULTRASONICALLY SOLDERING DRAWN ALUMINUM TUBING PRODUCTS

BACKGROUND OF THE INVENTION

This invention relates to improved ultrasonic soldering of drawn aluminum tube without flux. More particularly, this invention relates to a method for producing aluminum tube which is conditioned so as to be more readily soldered by ultrasonic fluxless soldering techniques.

Ultrasonic fluxless soldering of aluminum tube joints in the manufacture of heat exchangers is well known in the art as shown by "Ultrasonic Soldering Gives Aluminum a Boost", *Modern Metals*, August 1974, pp. 97, 100 and 102, and U.S. Pat. Nos. 3,760,481; 3,822,820; 3,831,263; 3,084,650; 3,920,176 and 3,833,986, all of which are incorporated herein by reference. In these processes a multiplicity of joints is assembled to provide a heat exchanger, and the joints are soldered by immersing in a pot of molten solder alloy without the use of a chemical flux. The joints are typically socket-tube joints wherein a tube is inserted into a socket provided by expanding and outwardly flaring the end portion of a tube of like size or diameter. Ultrasonic excitation of the bath facilitates wetting of the aluminum tube members which allows for eliminating the chemical flux and the attendant cleanup problems. It is important in ultrasonic soldering that the filler metal wet and adhere to the parent tube members. However, with certain aluminum tube products, difficulties have been experienced in making the joints in that sometimes the solder alloy did not properly wet the aluminum tubing. The problem in many instances is more prominent where the aluminum tubing is made by continuous drawing techniques as opposed to extrusion.

Extruded aluminum tube products are produced by hot extrusion, for instance at temperatures of 800° to 1000° F., essentially to its final tube dimensions in a single step starting with a billet of about 6 inches in diameter and finishing with a tube about ⅜ inch in diameter. In some cases, extruded tube is drawn through a sink die which reduces its cross section by about 0.01 to 0.015 inch in order to improve dimensional tolerance control and provide a slight increase in strength over the essentially annealed character of the tube as it exits the extrusion operation. Extruded tubes can usually be ultrasonically soldered without difficulty irrespective of whether the sinking operation is used. The internal structure of hot extruded tube is recognized as typically characterized by a mixture of unrecrystallized hot worked structure and coarse recrystallized structure.

The starting stock for the continuous drawing operation is typically a hollow extrusion about 2¼ inches in diameter made by hot extruding an 18-inch diameter billet. The extrusion is then drawn through a sequence of constricting dies of diminishing diameter, typically about 10 such dies in sequence. Each such draw operation employs a floating bulb mandrel and reduces the outside and inside diameters and the wall thickness of the aluminum stock and the sequence produces a coilable tube product about ¼ to ½ or ¾ inch, typically ⅜ inch, in diameter which is typically annealed to soften the work hardening effects of the draw operations. The internal structure of such drawn tube is recognized as typically characterized by a fine grained condition because of the cold working and annealing. Aluminum tubing produced by the aforesaid continuous sequential drawing sometimes experiences more rejections than extruded tube when made into heat exchanger assemblies by ultrasonic soldering because of "leaker" joints caused by less wetting of the tube joining surfaces by the solder alloy. While, in some cases, this may be attributed to improper cleaning or other solder process variations, it nonetheless appears that continuously drawn aluminum tube is more sensitive to variations in the process including the preliminary cleaning steps than extruded tube products. The sensitivity of the continuously drawn tube is not reduced any by well known and respected preconditioning methods, such as abrading with steel wool or sandpaper. This sometimes only aggravates the problem and further reduces the tube wetting during soldering.

SUMMARY OF THE INVENTION

In accordance with the invention, it has been discovered that continuously drawn tube products can be surface conditioned during their production, such that they are less sensitive to variations in the ultrasonic soldering process, such that there are less "leaker" joints produced in mass production ultrasonic soldering operations to produce heat exchanger assemblies. In accordance with the invention, drawn coilable tube products are produced by continuously drawing the tubing through a sequential series of diminishing sized dies to progressively reduce the diameter and wall thickness of the aluminum tube, which operations are performed at room temperature and work harden the tube. The work hardened tube after drawing is typically in a high work hardened condition, such as the H18 or H19 temper. Conventionally, such drawn tubing products are annealed to soften their temper and improve their formability such that they may be more readily bent into hairpin-type shapes for heat exchanger application. However, in accordance with the invention, the tubing is, prior to annealing, subjected to a burnishing operation, wherein it is drawn or pulled through an additional die, which functions differently from the drawing dies used to produce the work hardened tube shape. This final burnishing operation differs from the previous draws in that it does not employ a mandrel and does not significantly decrease the wall thickness of the tube and, further, produces but a minor decrease in outside diameter. This treatment, while seemingly inconspicuous, results in a marked change in the surface condition of the drawn tube so as to substantially improve its performance in ultrasonic soldering processes and reduce its sensitivity to variations in such processes and operations attendant thereto.

Accordingly it is an object of the present invention to improve the performance of continuously drawn aluminum tube products in ultrasonic soldering operations. More particularly, an object of the present invention provides for improved production of continuous drawn aluminum tube products so as to alter the surface characteristics of such tube products so as to improve the performance of the tube products in ultrasonic soldering operations by lessening their sensitivity to soldering process variations.

DETAILED DESCRIPTION OF THE PREFERRED EMBODIMENTS

Figure 1:
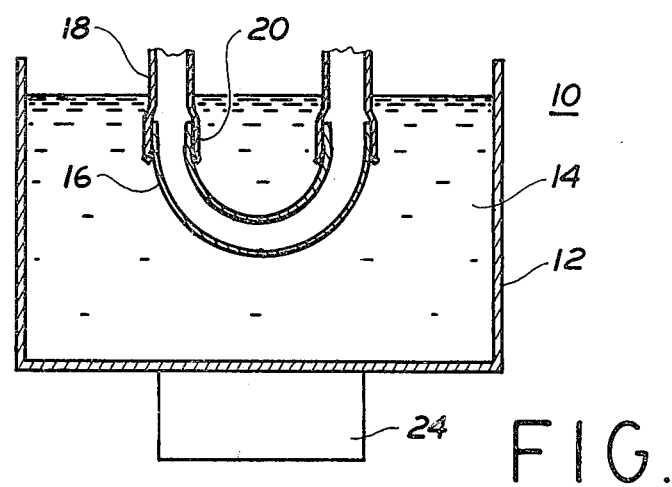
FIG. 1 is a schematic elevation in cross section depicting ultrasonic soldering of aluminum tube joints.

Referring now to FIG. 1, ultrasonic soldering of aluminum tube joints is schematically depicted. The ultrasonic soldering process 10 includes a pot 12 containing molten solder bath 14 in which the tube joint is immersed. Heating means, not shown, are provided to heat the solder and keep it molten. The tube joint comprises a return bend portion 16 and two tube members 18, each of which includes an expanded socket portion 20 in its bottom region for receiving the ends of the return bend portion 16. The joints connecting the return bend portion 16 to the tube portions 18 are of the socket type wherein a male member is inserted inside the expanded or bell mouth portion of a female member to provide an overlap or socket configuration of known type. The tube portions 18 themselves may be elongated hairpin-type return bends, and a typical heat exchange may comprise multiplicities of joints connecting the legs of different hairpin tubes to one another by return bend sections 16 to provide a heat exchanger. The bath 14 in pot 12 is excited ultrasonically by ultrasonic transducer 24. Solder alloy in the bath 14 typically comprises about 95% zinc and about 5% aluminum although the initial bath can be constituted of slightly higher amounts or even 100% zinc since some amount of aluminum is dissolved in the bath from aluminum tube members, and thus the bath picks up some aluminum content. Such solder alloys melt in the general temperature range of about 720° to 800° F. Other solder alloys also can be useful in ultrasonic soldering although the zinc base solder just mentioned is preferred. Such other solders can be lead or tin base or otherwise. For instance, known solders comprise, nominally, 63% Pb—34% Sn—3% Zn or 50—50 Pb-Sn or 91% Sn—9% Zn and others known in the art.

As indicated above, the initial stock for the tube is provided as a billet of typically large diameter, such as 18 inches, which is extruded to provide working stock for the subsequent drawing operations. Aluminum tube material for soldered heat exchangers is typically 1XXX and 3XXX series alloys. The 1XXX series alloys are considered pure aluminum and contain various degrees of impurities. For example, alloy 1235 is 99.35% pure aluminum. The 3XXX series alloys contain manganese as a major alloying element. For example, 3102 contains typically 0.2% Mn and alloy 3003 contains typically 1.2% Mn. Alloys 1235, 3102 and 3003 are common alloys used in ultrasonic soldering tubing applications. Other alloys believed useful in practicing the invention are the 5XXX alloys (Mg major addition) and the 6XXX alloys (Mg and Si major additions). Composition limits with respect to deliberate alloy additions and most major impurities are listed below for several 1XXX and 3XXX alloys along with some 5XXX and 6XXX alloys based on Aluminum Association listing (a single figure for an element other than aluminum indicates maximum).

TABLE 1

| Alloy | Si | Fe | Cu | Mn | Mg | Cr | Zn | Ti | Aluminum |
|---|---|---|---|---|---|---|---|---|---|
| 1100 | .95 Si + Fe | | .05–.2 | .05 | — | — | .10 | — | 99 min. |
| 1200 | 1 Si + Fe | | .05 | .05 | — | — | .10 | .05 | 99 min. |
| 1135 | .6 Si + Fe | | .05–.2 | .04 | .05 | — | .05 | .03 | 99.35 min. |
| 1235 | .65 Si + Fe | | .05 | .05 | .05 | — | .05 | .03 | 99.35 min. |
| 1250 | .2 | .4 | .1 | .01 | .01 | .01 | .05 | .03 | 99.5 min. |
| 3002 | .08 | .1 | .15 | .05–.25 | .05–.2 | — | .05 | .03 | Remainder with |
| 3102 | .4 | .7 | .10 | .05–.4 | — | — | .3 | .1 | incidental and |
| 3003 | .6 | .7 | .05–.2 | 1–1.5 | — | — | .1 | — | impurity elements. |
| 3303 | .6 | .7 | .05–.2 | 1–1.5 | — | — | .25 | — | |
| 3004 | .3 | .7 | .25 | 1–1.5 | .8–1.3 | — | .25 | — | |
| 3104 | .6 | .8 | .05–.25 | .8–1.4 | .8–1.3 | — | .25 | .1 | |
| 3005 | .6 | .7 | .3 | 1–1.5 | .2–.6 | .1 | .25 | .1 | |
| 3105 | .6 | .7 | .3 | .3–.8 | .2–.8 | .2 | .4 | .1 | |
| 5052 | .25 | .4 | .1 | .1 | 2.2–2.8 | .15–.35 | .1 | — | |
| 5183 | .4 | .4 | .1 | .5–1 | 4.3–5.2 | .05–.25 | .25 | .15 | |
| 5056 | .3 | .4 | .1 | .05–.2 | 4.5–5.6 | .05–.2 | .1 | — | |
| 6063 | .2–.6 | .35 | .1 | .1 | .45–.9 | .1 | .1 | .10 | |
| 6061 | .4–.8 | .7 | .15–.4 | .15 | .8–1.2 | .04–.35 | .25 | .15 | |

Figure 2:
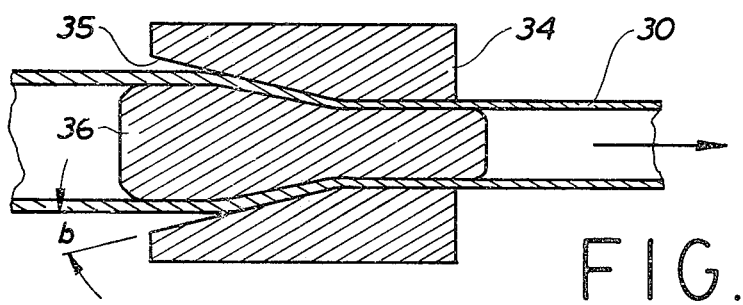
FIG. 2 is a schematic elevation in cross section illustrating tube drawing.

The relatively large billet of aluminum or aluminum alloy, for instance 18-inch diameter, is extruded at relatively high temperature of 750° to 1000° F. to provide hollow working stock for producing continuously drawn tubing. As indicated above, a typical extruded diameter is between two and three inches, for instance 2¼ inch, and having a wall thickness of about 0.155 or 0.16 inch. This stock is then drawn through a series of dies, each of which reduces the outside diameter, inside diameter and wall thickness as depicted in FIG. 2, which illustrates the operation in somewhat exaggerated form for clarity. In FIG. 2, the tube stock 30 is pulled between a constricting die 34 and a mandrel 36. The mandrel 36 is a floating mandrel and is held in position by the action of the metal moving over the mandrel 36 and through the die 34. This drawing operation is quite conventional, and several such operations are practiced in sequence so as to sequentially and progressively diminish the outside diameter, wall thickness and inside diameter of the tube 30. At each drawing stage, the cross-sectional area of the tube is reduced by about 10% to about 40% with typical reductions being in the neighborhood of 20% or 25% to 35%. The drawing reductions progressively reduce the tube size and wall thickness to substantially final dimensions. Since these operations are performed at essentially cold working conditions, they progressively work harden the tube metal as it is pulled through the progression of dies. By cold work is meant a metal working operation which commences at substantially room temperature but which can heat the metal through internal friction. Lubricant is employed to keep the aluminum tube moving through the dies 34 and over the mandrel 36 without excess friction or damage to either the aluminum tube 30 or the dies 34 or mandrels 36. The lubricant also extracts heat formed during metal working. Typically in moving through the plurality of dies, for instance, at least five dies in sequence, and typically eight to ten or more dies in sequence, the total reduction in metal cross-sectional area can vary from about 50% or 60% up to 90%, preferably 65% or 70%, or more. When the reduction exceeds 75 or 80%, the tube is in the H19 temper, which is a severely cold work hardened condition.

Figure 3:
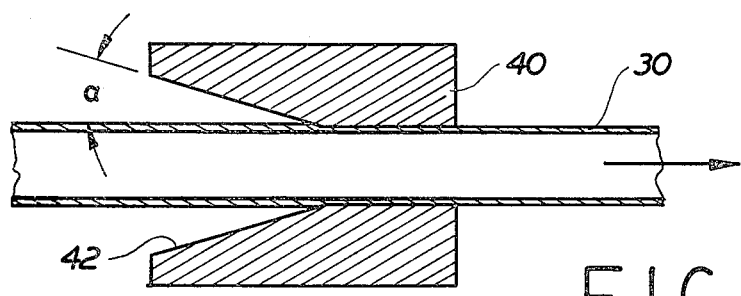
FIG. 3 is a schematic elevation in cross section illustrating the burnishing pass in accordance with the invention.

The tube in work hardened condition is then passed through a die forming operation which is somewhat different than preceding die forming operations during drawing. As depicted in FIG. 3, the tube 30 is drawn through a single die 40 without a floating mandrel. The die 40 performs a burnishing operation, rather than a significant metal working operation on the tube 30. It is important that the die 40 reduce the outside diameter of the tube 30 by a relatively small amount, such as about 0.010 inch or preferably less, for instance about 0.001 or 0.002 inch to about 0.008 or 0.009 inch, outside diameter reduction. For a tube about ⅝ inch in diameter, a reduction in moving through die 40 of about 0.006 inch is satisfactory. Since the burnishing operation in FIG. 3 is effected without a mandrel or inside diameter metal working surface, the wall thickness of the tube 30 is not altered substantially; that is, not changed by more than a few percent in cross-sectional area, such as less than 5% in cross-sectional area, typically less than 1% or 2%. What metal working as does occur in the burnishing operation is concentrated in the outside surface region. This can be contrasted with the preceding sequential drawing operation in which, at a plurality of stages, the tube was worked by pulling through die 34 and over mandrels 36 which provided both inside and outside tube working surfaces and which quite substantially reduced the wall thickness, outside diameter and inside diameter of the tube 30 and performed a substantial degree of cold metal working and related work hardening across the entire thickness of the tube wall. It is preferred that die 40 in the burnishing operation have the tapered surface 42 at an angle "a" of about 14° to 20°, with respect to the tube outside diameter (included angle of 28° to 40° for tapered surface 42). This differs somewhat from the tapered die surface of the previous metal working draw die stages shown in FIG. 2 where the die angle "b" relative to the tube surface is typically between about 8° and 12°, for instance about 10° (included angle of tapered surface 35 of 16° to 24° or 25°).

It is also preferred that the tube 30 be pulled through the burnishing die 40 substantially immediately after exiting the last drawing die 34 and as part of the same tube pulling operation. That is, if there are ten drawing die stages, FIG. 2, in sequence the burnishing die 40 is added as the eleventh stage and the tube is pulled through all eleven stages in a single draw or pull. However, on a less preferred basis the tube can be pulled through the drawing stages, FIG. 2, and thereafter pulled through burnishing die 40, FIG. 3, as a separate operation.

In practicing the invention it is preferred to perform the burnishing operation with the tube in a cold work hardened temper, preferably a relatively high cold worked temper such as H18 or H19 temper, or on a less preferred basis H16 or H14 temper levels. The burnishing operation when performed on the highly cold worked tempers appears to confer maximum benefit in conditioning the tube outside wall for fluxless ultrasonic soldering. Thus it is preferred that the continuously drawn tube be in a condition corresponding to a cold reduction in metal cross-sectional area at least 40 or 50%, preferably at least 65 or 70%, for instance 75 or 80% or more, when burnished. It is preferred that no thermal treatment such as an annealing treatment or the like be performed between the drawing operation and the burnishing operation which is preferably performed on the tube in essentially the same cold work hardened condition as it exits the drawing operation.

On a less preferred basis, a mild thermal treatment considerably less severe than a complete annealing treatment can be interposed between the drawing and burnishing operations. Such a treatment could be of the so-called stress relief or partial anneal variety which is considerably less than enough to completely remove cold work effects as occurs in a complete annealing treatment. Such a mild thermal treatment can utilize temperatures in the range of around 225° to 400° F. and leave the metal in a substantially work hardened condition, corresponding to the strength level of tube reduced 40% or more in cross section without any thermal treatment. For instance, an H19 tube (80% reduction) could be heated for an hour or two at 300° F. and still possess a very high degree of work hardened strength effects and be suited for burnishing in accordance with the invention, but on a less preferred basis than the H19 tube as originally drawn. Such a tube after such a mild thermal treatment would still retain a higher strength level than if it had been simply cold reduced 40% from annealed starting stock without any subsequent thermal treatment and thus is still considered as being in a work hardened condition.

The lubricant employed in the burnishing operation is preferably a high surface film strength lubricant having a relatively low viscosity, for instance 25 to 100 seconds saybolt universal (SSU) at 100° F. A thicker or higher viscosity lubricant has been found to interfere with the burnishing action. Hence, it is preferred to use lubricants which wipe easily from the tube which should feel relatively dry to the touch as a result of the burnishing operation with little lubricant being retained on the surface.

After burnishing, the tube can be completely annealed or partially annealed to achieve the desired strength and flexibility properties. Thus in accordance with the invention the burnished tube is heated to a temperature of about 400° to 800° F. for a period of time sufficient to reduce its tensile strength to the fully annealed or "0" condition or to a condition characterized by a strength level equivalent to or less than that achieved by a cold reduction amounting to ⅓ or ½ the cold reduction imparted in the sequential drawing operations. For instance, a partial annealing treatment can reduce the strength level to that corresponding to a 20% area reduction or less. Such thermal treatments improve the bendability and workability of the tube to enable formation of the return bend and hairpin sections along with the expanded socket portions, as shown in FIG. 1.

After annealing the tube can be oiled slightly to further enable its use in metal working procedures attendant to heat exchanger manufacture.

EXAMPLE

Aluminum alloy 3102 containing nominally 0.2% manganese is provided as an 18-inch diameter solid ingot produced by continuous casting. The ingot is sawed into extrusion billet and extruded at a nominal temperature of 850° F. to provide a 2¼ inch outside diameter by 0.155 inch wall extruded tube. This tube is drawn in 10 passes employing a floating mandrel as depicted in FIG. 2 to produce a ⅜-inch outside diameter tube with a typical wall thickness of 0.032 inch. The total reduction in cross-sectional area imparted by the continuous sequential drawing operations amounted to about 95% and produced a highly work hardened H19 temper condition. At the individual drawing stations cold reductions in cross-sectional area ranged from about 20 to about 40%.

This tubing in the H19 temper was pulled through a burnishing die as depicted in FIG. 3 which reduced the outside diameter of the tube by a mere 0.006 inch without any significant change in wall thickness. The tube was then annealed by heating to about 800° F. for sufficient time to reduce its strength to the dead soft or fully annealed condition. This tube was tested for surface wettability and evaluated in producing heat exchanger assemblies by fluxless ultrasonic soldering. The tube was compared with other tube manufactured the same way but with the omission of the burnishing operation. In one wettability test the improved tube demonstrated an improvement ranging from 100 to 200%. In this test tubes are immersed an equal depth into an ultrasonically agitated solder bath and the length wet by the bath is measured. The improvement is the extent by which one wet length exceeds another. In soldering heat exchangers the improved tube demonstrated a 70% improvement by way of reduced "leakers". The foregoing Example demonstrates the improvement achieved by the practice of the invention which produces a tube much less sensitive to variations in ultrasonic soldering and associated procedures. The improvement in reduced "leakers" is particularly significant. A heat exchanger could comprise 50 or more joints. If a single joint leaks, the assembly is considered a "leaker" and hence a 70% improvement by way of reduced leakers is a good measure of repeatable improvement.

The improved process and resultant improved continuously drawn tube product have been described largely in association with fluxless ultrasonic soldering process applications where the improvement has been so clearly demonstrated. However, it is believed that the improvement may offer advantages in other applications where an improved surface condition is desired.

While the invention has been described in terms of preferred embodiments, the claims appended hereto are intended to encompass other embodiments which fall within the spirit of the invention.

What is claimed is:

1. In a process wherein a socket-type tube joint comprising an aluminum tubular member is joined by fluxless ultrasonic soldering and wherein said aluminum tubular member is provided from a coilable tube produced by drawing elongate hollow aluminum stock through a sequence of drawing die stages of progressively diminishing size with floating mandrels therein to progressively reduce the diameter and wall thickness of the aluminum stock by cold working such stock between said dies and floating mandrels to provide said aluminum coilable tube in work hardened temper, wherein the improvement comprises pulling said coilable aluminum tube in work hardened temper through a burnishing die which concentrates its work effects substantially in the outside surface region of said tube thereby to precondition said outside the surface for said ultrasonic fluxless soldering.

2. In a process wherein a socket-type tube joint comprising an aluminum tubular member is joined by fluxless ultrasonic soldering and wherein said aluminum tubular member is provided from a coilable tube produced by drawing elongate hollow aluminum stock through a sequence of drawing die stages of progressively diminishing size with floating mandrels therein to progressively reduce the diameter and wall thickness of the aluminum stock by cold working such stock between said dies and floating mandrels, and wherein for a plurality of said die stages said aluminum stock is reduced in cross-sectional area by from 10 to 40% at each such stage and wherein the cumulative reduction in cross-sectional area for the drawing stages is at least 50%, to provide said aluminum coilable tube in work hardened temper, wherein the improvement comprises pulling said coilable aluminum tube member in a work hardened temper through a burnishing die without a floating mandrel therein, wherein said burnishing die concentrates its work effects in substantially the outside surface region of said tube and reduces the outside diameter of the tube by not more than 0.010 inch thereby to precondition said outside tube surface for said ultrasonic fluxless soldering.

3. The improvement according to claim 2 wherein said drawing dies include a tapered entrance portion characterized by an included die angle of from 16° to 25°.

4. The improvement according to claim 2 wherein said burnishing die includes a tapered entrance portion characterized by an included die angle of 28° to 40°.

5. The improvement according to claim 2 wherein said drawing stages reduce the cross-sectional area of said aluminum stock by at least 60%.

6. The improvement according to claim 2 wherein said drawing stages reduce the cross-sectional area of said aluminum stock by at least 75%.

7. The improvement according to claim 2 wherein said burnishing die reduces the outside diameter of said tubular member by from 0.002 inch to less than 0.010 inch.

8. The improvement according to claim 2 wherein said tubular member is approximately ¼ inch to ½ inch in outside diameter and wherein said burnishing die reduces the outside diameter by about 0.002 inch to less than 0.010 inch.

9. The improvement according to claim 2 wherein said tube is drawn sequentially through said drawing die stages and said burnishing die in a single drawing operation.

10. The improvement according to claim 2 wherein said tubular stock after drawing is passed through said burnishing die without any thermal treatment between said drawing and burnishing operations.

11. The improvement according to claim 2 wherein a high surface film strength lubricant having a low viscosity is applied to the outside tube surface at the burnishing die operation.

12. The improvement according to claim 11 wherein said lubricant has a viscosity of from 25 to 100 SSU at 100° F.

13. The improvement according to claim 2 wherein said tube after said burnishing operation is heated to soften its temper.

14. The improvement according to claim 2 wherein said tubular stock after said burnishing operation is thermally softened to substantially the annealed condition.

15. The improvement according to claim 13 wherein said tubular member after said thermal treatment has applied thereto a lubricant film.

16. In a process wherein a plurality of socket-type tube joints each comprising an aluminum tubular male member positioned within an expanded socket provided in another aluminum tubular member are joined by fluxless ultrasonic soldering to provide a heat exchanger assembly by immersion in an ultrasonic bath of a molten solder alloy with the expanded sockets open end facing downwardly in said molten solder, withdrawal from the solder bath and solidification of said solder alloy and wherein said aluminum tubular male member is provided from coilable aluminum tube, the improvement wherein said coilable aluminum tube is produced by the steps comprising:

(a) hot extruding at a temperature of 750° to 1000° F. to provide hollow elongate aluminum stock suitable for drawing;

(b) drawing said aluminum stock by pulling said stock through a sequence of drawing die stages of progressively diminishing size with floating mandrels therein to progressively reduce the diameter and wall thickness of the aluminum stock by cold working such stock between said dies and floating mandrels to provide coilable aluminum tube in work hardened temper;

(c) at least a plurality of said die stages each reducing the cross-sectional area of said stock by 20 to 35%, said drawing dies including a tapered entrance portion characterized by an included die angle of from 16° to 25°, the total reduction in cross-sectional area achieved in said drawing stages totaling at least 70%;

(d) further pulling said coilable aluminum tube through a burnishing die without a floating mandrel therein, said die comprising a tapered entrance portion characterized by an included die angle of 28° to 40°, which said burnishing die concentrates its work effects substantially in the outside surface region of said tube and reduces the outside diameter of said tube by from 0.002 inch to 0.010 inch, said coilable tube having applied to its outer surface of said burnishing die a high surface film strength lubricant having a relatively low viscosity within the range of about 25 to 100 SSU at 100° F.;

(e) said pulling through said drawing die stages and burnishing die being effected within a single pull operation such that said coilable tube is pulled through the last drawing stage and directly into and through said burnishing die in said single pulling operation, there being no thermal treatment of said coilable tube between said drawing stages and said burnishing operation;

(f) thermally treating said tube after said burnishing to soften its temper, reduce its strength and increase its formability.

17. In a process wherein a socket-type tube joint comprising an aluminum tubular member is joined by fluxless ultrasonic soldering, said aluminum tubular member being provided as a coilable continuously drawn tube, wherein the improvement comprises providing said tube with an improved surface condition of improved wettability prior to effecting said fluxless ultrasonic soldering, said surface condition being imparted by pulling said tube in a work hardened condition corresponding to a cold reduction in cross-sectional area of at least 50% through a burnishing die without a floating mandrel therein, wherein said burnishing die concentrates its work effects in substantially the outside surface region of said tube such that the outside diameter of the tube is reduced by less than 0.010 inch.

* * * * *